United States Patent Office 3,046,063
Patented July 24, 1962

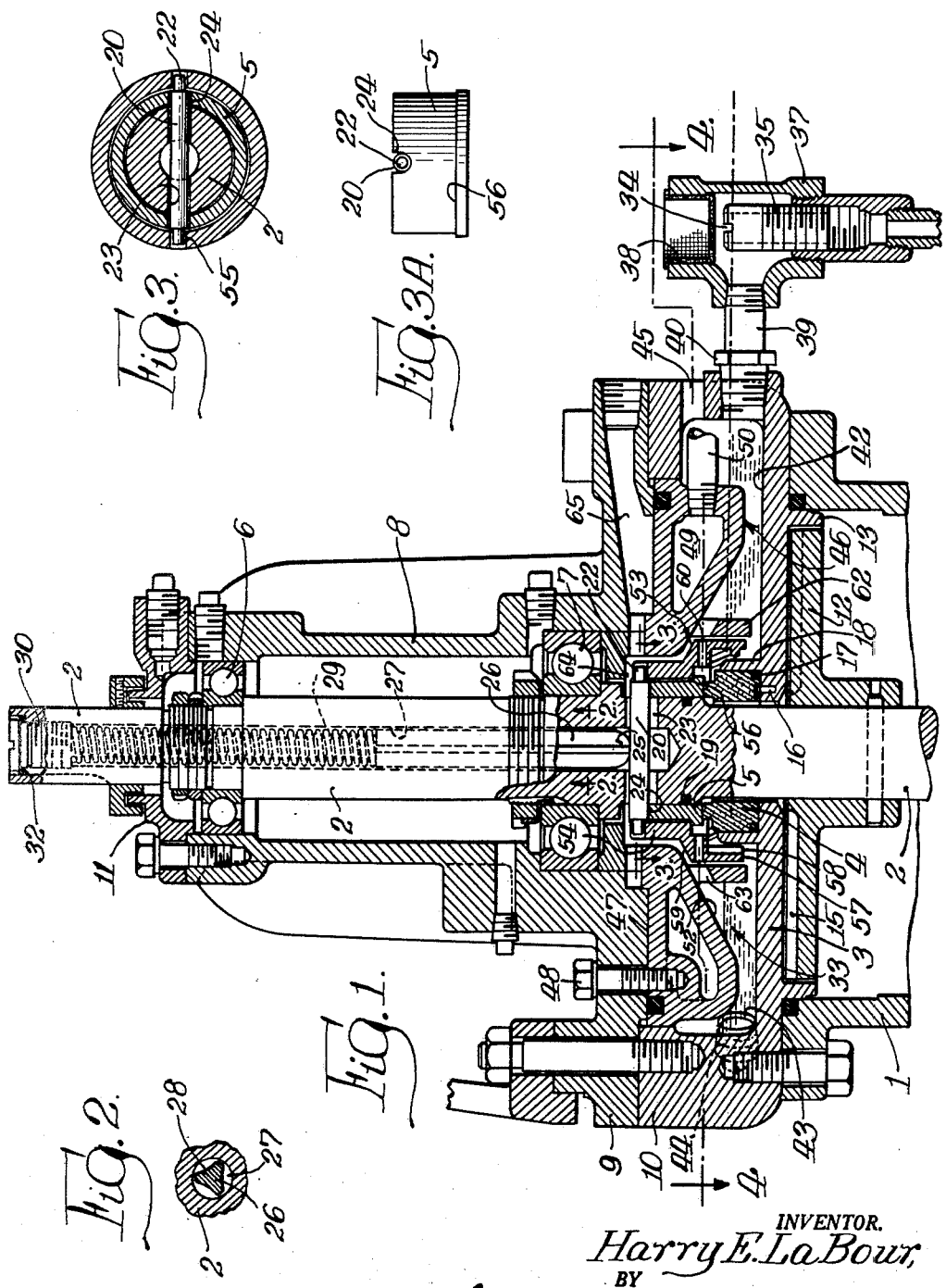

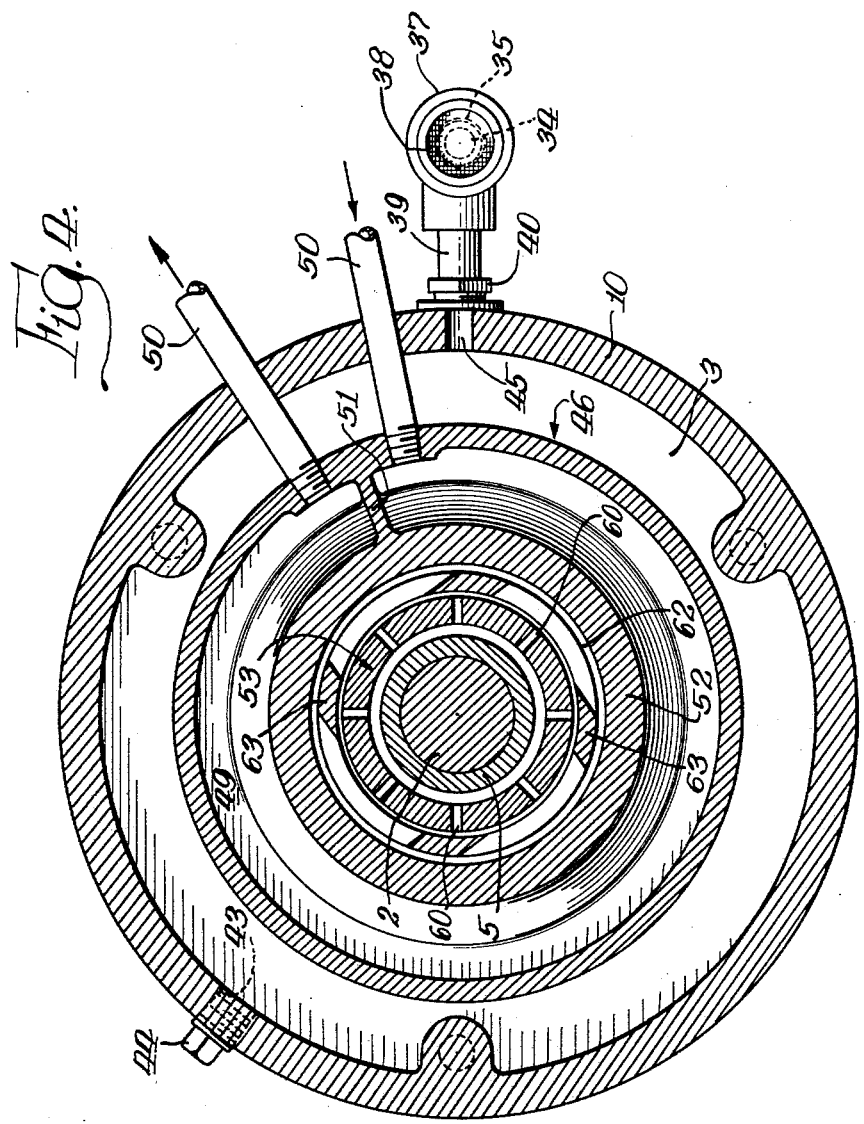

3,046,063
SHAFT SEAL
Harry E. La Bour, % The La Bour Co. Inc.,
Elkhart, Ind.
Filed Sept. 27, 1960, Ser. No. 58,682
11 Claims. (Cl. 308—187.1)

This invention relates to shaft seals. It is particularly applicable to hydraulic centrifugal pumps of the vertical shaft type, but is not to be regarded as confined thereto. The invention further concerns a compact shaft seal and bearing construction also suitable for centrifugal pump use, but not to be regarded as confined thereto.

It is a primary problem of all hydraulic centrifugal pumps to keep the seal between the shaft and the pump casing gas and liquid tight. This basic requirement is particularly important in the case of self-priming centrifugal pumps in which my present invention finds particular utility.

The problem increases in severity where the pump is to be applied to acid service. The presence of entrained solids in the medium being pumped presents further difficulty. The problem of maintaining the seal is further complicated when the head upon the intake may vary during operation from a positive head to a negative head.

To meet the needs of such situations effectively and economically requires a so called mechanical seal, i.e., two rubbing parts sealed to the shaft and to the casing, respectively, and held in fluid tight engagement while running. The unavoidable friction of two solid parts rubbing together even though lubricant is applied, develops heat, and continued development of heat leads to high temperature, which is inimical to the life of elastic seal rings and similar parts. Furthermore, the accumulation of heat is undesirable because it deteriorates lubrication both on the rubbing seal members and on the mechanical bearings.

For certain purposes, such, for example, as handling radio-active material, it becomes necessary to install the pump and leave it without possibility of servicing during an extended period, subject only to periodically adding lubricant. No servicing is possible short of removal of the pump, which removal will then usually occur after some definite period of use, such as three to five years.

While certain forms of self-priming pumps built in accordance with earlier patents issued to me (see Patents No. 2,381,823 and No. 2,603,160) have fulfilled the requirement of long unattended use by the employment of liquid seals, such pumps have found a limited market chiefly because of cost.

Pumps for acid service generally involve the use of expensive alloys for resistance to corrosion of the parts exposed to the corrosive attack of the medium pumped, and there is an incentive to reduce the amount of such expensive metal to the minimum. This may be done, in some degree, by compact design, and for some situations rotating the impeller shaft at higher speeds.

But the urge to greater compactness and higher shaft speeds must be restrained because of the resultant difficulty of throwing off the heat generated by the seal and the adjacent bearings in such a compact design. Heat is the greatest enemy of a shaft seal, no matter how it comes about, and any proposed construction which cannot dissipate heat at a rate fast enough to remain below a predetermined maximum, cannot be utilized for service under the conditions above referred to. Excessive temperature reduces the effectiveness of lubrication, both on the rubbing seal parts and upon the bearings. It also produces deterioration of packing, such as O-rings or other sealing members essential to fluid tight fitting of the parts.

Lubrication is an important factor in operating a shaft seal, but lubrication by itself cannot overcome the injurious effects of the accumulation of heat with consequent rise in temperature which tends to occur in a compact arrangement of the parts.

It is desirable to support the impeller shaft by bearings disposed as close to the impeller as possible in the interest of compactness and accuracy. But the unavoidable development of heat from the bearings must not be allowed to interfere with dissipation of heat from the rubbing seal. Any increase in shaft speed tends to aggravate the problem.

The matter of supplying lubricant to the seal, under the safeguard that sudden failure of seal lubrication cannot be brought about by the development of leakage in the seal, is a subject of my prior Patent No. 2,910,313, of October 27, 1959. The present invention is an improvement upon that invention, with the broad purpose of providing a free exit for heat unavoidably developed by the bearings and/or seal.

While retaining the novel method of applying lubricant in such manner as to safeguard the seal against a sudden failure of lubrication which would occur if the seal should begin to leak and suck lubricant into the interior of the pump casing, I have found it possible to introduce a highly efficient "heat sink" into the circuit of the circulating liquid lubricant which is applied to the seal parts.

One feature leading to the possibility of accomplishing the intended purpose of highly effective heat extraction from the rubbing seal parts is a complete rearrangement of the means for applying suitable spring pressure to the seal parts.

The chief object of the present invention is to provide a compact system of effectively cooling the liquid lubricant, such as oil, which is applied to the rubbing seal. I employ the term "oil" as generic to suitable liquid lubricants.

An object of the invention is to provide means for applying a suitable spring pressure to the seal members without placing any hindrance to the free and rapid transfer of heat from the seal to a heat sink by a spray of lubricant.

A further object is to direct a spray of oil, from a body of oil in a reservoir at a lower level, onto a rubbing seal to cool and lubricate the same and at the same time to direct oil in a spray from said same body against a heat extracting surface from which the oil drains back into the reservoir.

A further object is to circulate oil from a body of oil disposed at a level below the seal into contact with the seal and from there into contact with a heat extracting surface above the level of the body of oil whereby the circulating oil is cooled and drained back into the main body of oil.

A further object of the invention is to provide a compact bearing and seal arrangement suitable for a self-priming centrifugal pump subject to variations in intake pressure above and below atmospheric wherein a heat sink is effectively interposed between the two sources of heat generation, i.e., the bearing and the seal, to insure against damaging accumulations of heat at either the bearing or the seal or seal gaskets.

A further object is to provide an effective means of transferring heat from the seal parts to the heat sink by a circulation of lubricating oil which is so operated as to avoid any rapid depletion of the oil in the event of seal leakage.

A further object is to provide a heat sink with a part thereof dipping below the level of the pool or reservoir of lubricating oil and another part disposed above the level of lubricant in the pool or reservoir to secure the effect of rapid flow of oil along the exposed or unsubmerged surface thereof while preserving the protection of the seal against sudden depletion of lubricant in case of a leak developing in the seal.

Further objects and advantages will become apparent from the following detailed disclosure.

Now in order to acquaint those skilled in the art with the manner of constructing and practicing my invention, I shall describe, in connection with the accompanying drawings, a specific embodiment of the same.

In the drawings:

FIGURE 1 is a vertical longitudinal section through the vertical shaft bearings, shaft seal and related parts of a vertical self-priming centrifugal pump;

FIGURE 2 is a fragmentary section on the line 2—2 of FIGURE 1;

FIGURE 3 is a transverse section on the line 3—3 of FIGURE 1;

FIGURE 3A is a side view of the seal ring member and driving spider or pin shown in FIGURE 3; and FIGURE 4 is a cross section taken on the line 4—4 of FIGURE 1.

The embodiment shown in the drawings is a vertical self-priming pump having a mechanical seal. The pump comprises primarily a pump casing 1 shown in dotted lines. This pump and its casing may be such, for example, as that shown in FIGURE 1 of my prior Patent No. 2,910,313. Within the casing 1, there is a suitable impeller, not shown, which is mounted upon the impeller shaft 2. This impeller operates in conjunction with a suitable intake, discharge ports and priming ports, such as are now well known in the art. This impeller shaft 2 extends through the cover plate 3 which forms the top wall of the pump casing 1. The shaft is sealed to the said pump casing at the part where it passes through said cover plate 3, by means of a stationary seal member 4 sealed to the top plate 3 and a movable seal member 5 carried on and sealed to the impeller shaft 2. This shaft 2 is mounted in the upper bearings 6 which can float axially and are used largely for radial load and the lower ball bearings 7 which carry radial and axial load of the impeller shaft and its connected parts. These bearings 6 and 7 are supported in a bearing barrel 8 which has a suitable cap 11 at the top, and which has an integral horizontal foot or radial flange 9 at the lower end resting upon a cylindrical flange 10 of the cover plate 3 of the pump casing.

The impeller shaft 2, in case the pump is for handling corrosive liquids, will be made of corrosion resisting material up to a point above the shaft seal.

The lower part of the shaft may carry a rotatable disk 12 disposed inside an annular circular flange 13 for reducing access of liquid in the casing to the seal. This service is performed by vanes or ribs 15 on the top surface of the disk 12, so that during normal operation of the pump with the shaft and impeller running, the ribs or vanes 15 will tend to expel any liquid which tends to enter between the rim of the disk and the flange 13 in the direction of the seal parts 4 and 5.

The stationary seal member 4 is preferably made of a material which is softer than the material of the movable member 5. Thus, for example, the member 4 may be made of a baked carbon ring or a ring of graphite or of some synthetic resin or like material or a mixture of materials. The movable ring 5 is made of a harder material, such, for example, as a stainless steel, porcelain or other vitreous or baked or fused material which may be accurately formed or machined to shape, and surfaced to engage endwise with the carbon bearing ring 4. The carbon ring 4 is pinned, as by means of the pin 16, to the cover plate 3, to prevent rotation, and it is sealed by the O-ring 17 inside of the annular flange 18 formed as part of the cover plate 3. The said ring 4 may be cemented into the socket in said annular flange 18, or may merely be fitted mechanically thereinto. It is intended that the carbon ring 4 shall suffer most of the wear.

The movable ring 5 is sealed to the shaft as by means of the O-ring 19, which permits adjustment up and down of the said ring 5, while maintaining a fluid-tight seal between the ring and the shaft. Spring pressure is imposed upon the ring 5 to press it yieldingly against the upper face of the carbon ring 4 through a spider member 20, in this case a transverse pin having reduced ends at 22. The spider 20 in this case is a straight cylindrical bar extending diametrically through the shaft 2, and being disposed in the diametrical slot 23, as shown in FIGURES 1, 3 and 3A. If desired, this element 20 may be a three or a four-legged spider for application of spring pressure to the said sealing ring 5. The ends of the arms short of the reduced terminal portions 22 are disposed in U-shaped grooves or slots in the upper end of the said sealing ring 5, as shown in FIGURE 3A. These full diametric ends of the spider 20 engage the bottom of the U-shaped slot 24 at each end and are thereby able to transmit pressure to the said sealing ring 5, and at the same time key the said sealing ring 5 to the shaft 2.

The central part of the spider, which in this case is a transverse pin 20, is engaged by the hemispherical end 25 of the spring loaded thrust rod 26, which lies in the cylindrical bore 27 of the shaft 2. The said bore 27 extends from the upper end of the shaft 2 down to and slightly below the radial slots 23, 23. The said spring loaded thrust rod 26 is milled or slabbed off on three sides, as shown at 28, FIGURE 2, to reduce the area of contact or capillary gap between the said rod 26 and the bore 27, while at the same time centering and guiding the rod in the bore. The upper end of the rod is engaged by a compression coil spring 29 and the coil spring is held under pressure by the screw plug 30 which screw plug 30 is sealed to the walls of the bore at an offset at the upper end thereof by an O-ring 32. It will thus be seen that the spirng 29 and thrust rod 26 are disposed in an air pocket and any vapors, gases or liquids which would tend to rise in the bore would compress the gas trapped therein and would be prevented from flowing through or any substantial distance into said bore. The upper and lower bearings of the shaft 2 are mounted in the bearing barrel 8 and provided with conventional lubricating means which map optionally be grease lubrication or oil lubrication as desired. In the case of grease lubrication, a grease sealing ring may be interposed between the lower bearing 7 and the shaft sealing members. Where oil lubrication is relied upon, suitable feeding means for supplying oil to both bearings 6 and 7 is provided, and the oil draining from these bearings may be allowed to enter the oil pool 33 hereafter referred to. The cover plate 3 for the pump casing 1 comprises a central disk-like portion through the center of which the shaft extends, and at the center of which the seal is formed. The outer circumferential part of the said cover plate 3 has a vertically extending flange 10, and the said flange 10 is engaged by the circular base or foot portion 9 of the bearing barrel 8. Said cover plate 3 forms a dish-like member for holding a body of lubricating oil which performs a cooling as well as a lubricating function as is later described. Said circular foot member 9 overlies the annular space the lower part of which forms an oil reservoir 33. When the pump is in operation, an oil feeder not shown supplies a flow of oil either through the bearings 6, 7 or independently of the same, to the said reservoir 33, and the oil level in the said reservoir is maintained by the notch 34 in the standpipe 35. This standpipe 35 is adjustably mounted as on screw threads on the inside of a drain pipe 36 connected to the lower leg of the T-fitting 37. The upper leg of the T-fitting 37 is closed by a releasable or removable cap 38 for inspection and adjustment of the said standpipe. This cap 38 may be formed of screen to admit atmospheric pressure. The central leg of the T is connected by a nipple 39 and bushing 40 to the wall 10 by means of a threaded opening through said wall. The opening for bushing 40 lies on substantially the same level as the floor 42 of the oil reservoir 33. This is for the purpose of permitting all of the oil to drain out of said connection.

A similar drain opening 43 and normally closed drain connection 44 is provided on the opposite side of the oil reservoir to facilitate flushing out the said oil reservoir.

A vent opening 45 disposed above the normal oil level 31 permits the oil reservoir 33 to communicate with atmosphere for breathing. If undesirable fumes escape at the seal, the breather opening 45 may be sealed off, and such fumes vented through passage 65.

A heat sink member 46 in the form of an annular hollow body has a flat upper surface, as shown at 47. This flat upper surface is clamped by means of the bolts 48 to the flat lower wall of the bearing barrel foot 9. The heat sink member 46 is thereby put into thermal conducting relation with the bearing barrel close to the lower bearing 7. A hollow interior passageway 49 is connected to a pair of pipes 50, one of which is shown at the right of FIGURE 2. An inlet pipe 50, and a similar outlet pipe extend through the upstanding wall 10 of the cover plate 3 at an angular position out of register with any interfering parts. The inlet and outlet pipes for cooling fluid through the circular channel or space 49 are disposed adjacent to each other where they extend through and are sealed to the said wall 10. There is a transverse web in the said hollow space 49 between said pipes, so as to constitute the space 49 a circular passageway for cooling fluid from an inlet pipe 50 to a similar outlet or discharge pipe when the pump is in operation. Thereby a flow of cooling current, such as water, is caused to pass through the hollow interior 49 of the heat sink member 46.

The lower part of the said heat sink member 46 extends below the oil level, so that said heat sink member is in contact with the stationary body of oil for extracting heat therefrom. The said heat sink member 46 has an inwardly facing conical wall 52 extending from the lower end of said member 46 upwardly and inwardly, and it provides an important impingement surface for a spray of lubricant which is driven against said inclined wall.

A spray impeller member 53 has at its upper end a cylindrical hub portion 54 which embraces, but does not grip the movable seal member 5 carried on the shaft 2. At its upper end, the hub 54 of the spray impeller 53 has radially disposed notches 55 for receiving the reduced end portions 22 of the spider member 20. In this construction, said notches are on a diameter of the shaft 2. Thereby the spray impeller 53 is keyed to the shaft 2 by the spider member 20, and driven thereby independently of the seal member 5. The lower end of the hub 54 rests upon a shoulder 56 on the seal member 5. Said spray impeller member 53 is thereby held against movement axially or endwise of the shaft 2. The spray impeller member 53 includes a skirt or depending flange portion 57 having internal or inwardly extending ribs or vanes running from the top to bottom of the skirt, which tend to scoop up oil as the said impeller member is rotated. Said vanes or ribs 58 are preferably disposed in somewhat helical or screw thread fashion and inclined with their lower ends forward in the direction of rotation so that oil which is engaged by the lower end of the skirt member will tend to be thrown upwardly between the skirt and the adjacent annular flange 18 of the casing cover member 3. This creates a spray which rises to the upper end of the space between said skirt and the seal members 4 and 5. Said seal members are thereby contacted with a spray of lubricant at all times that the shaft is operating. The skirt member 57 and the hub member 54 are joined by a conical annular shoulder portion 59. The upper end of the space between said oil spray impeller member and the seal members 4 and 5 communicates with the outside of the said skirt member 57 through a series of impeller passageways 60 which are disposed preferably substantially radially so as to throw fluid or spray outwardly by centrifugal force. The size and number of impeller passageways may be selected to give a greater or lesser pumping action as desired.

A downwardly extending cylindrical flange member or circular wall 62 is connected integrally with the inclined wall 52 of the heat sink member 46 by means of a series of short posts or webs 63 (see FIGURE 4) having their edges disposed substantially tangential to the rotating skirt member 57 and the pumping passageways 60 in the direction of rotation of the said impeller shaft. This is to facilitate the discharge of fluid and spray through the said passageways 60 and from the outer surface of the spray impeller 53 into contact with the downwardly and outwardly inclined surface 52 of the heat sink member 46. A rapid transfer of heat from the immediate vicinity of the seal is thus effected.

The spray impeller 53 is sufficiently loosely mounted on the sealing ring 5 to permit thermal contraction and expansion of the parts without interference. The spray impeller moves down with the movable seal member 5 when wear occurs on the stationary carbon seal ring 4. The ports 60 through which spray and fluid is driven by centrifugal action are high enough above the wall 62 and the level 31 of the oil that the downward adjustment to compensate for wear will not interfere with the function of these parts.

An annular space 64 around the upper ends of the seal member 5 and spray impeller 53 communicates by way of a passageway 65 to a vent. The passageway 65 may normally be plugged at its outer end, and the opening 45 kept in communication with the atmosphere or led to a suitable ventilating or exhaust duct. When the pump is applied to pumping of a medium which involves undesirable or toxic fumes, the opening 45 may be plugged or may be omitted, and the duct 65 connected to an exhaust or ventilating duct as desired.

The operation of the device disclosed is as follows: The shaft 2 is coupled to a driving motor, either by direct coupling, belt or gear drive or otherwise for driving the shaft and connected parts at the desired speed. Preferably, the pump is designed for a speed of around 1750 r.p.m. to any particular speed of operation of the seal and the pump. Rotation of the shaft 2 drives the pump impeller not shown, and the so called balancing impeller 12 to keep liquid out of contact with the seal as much as possible. Movement of the shaft 2 turns with it through the medium of the spider or cross pin 20 both the moving seal member 5 and the impeller 53. The movable seal member 5 is sealed as by means of the elastic O-ring 19 to the impeller shaft. The said O-ring 19 is made of rubber or a rubberlike material adapted to retain its resilience even under extended periods of temperature in the neighborhood of boiling water. The seal member 5 is adjustable endwise of the shaft under the influence of the spring 29 and the thrust rod 26 as the softer sealing member 4 wears away, and it is essential that said O-ring remain gas tight throughout the normal life of the pump. While the pump is running, oil is fed by a suitable oil feeder to the reservoir 33, so that there is a constant small overflow at the standpipe notch 34.

Also while the pump is running, cooling fluid, such as cooling water, is admitted through one of the pipes 50 and exhausted through the corresponding discharge pipe, through the heat sink member 46 by flowing around through the circular passageway 49 inside the body of said member 46. This heat sink member is interposed between the bearings and the seal to the extent that heat from the bearings can be conducted directly to the top wall of the heat sink member and can be conducted to the heat sink member through the medium of oil spray from the seal members and contact with oil in the reservoir at the lower portion of said member 46.

The skirt member 57 of the spray impeller 53 extends below the normal oil level, and during rotation throws up a spray of oil into the space between the said spray impeller and the seal members thereby constantly applying lubricant to the same. Heat is developed by the rubbing frction between these parts, no matter how well they are lubricated, and since a fluid-tight seal must be maintained here, pressure between the parts must be high enough to keep the lubricating film between them of no great thickness. As poined out in my prior patent above referred to, there is an advantage in having the carbon seal ring 4 of such character as to hold in its wear surface small pockets of lubricant. Baked coke and tar mixtures provide a vesicular structure which provides this desired property. It is advantageous to keep the engaging seal members bathed with lubricant at all times as by raising liquid lubricant in the form of a spray from a lower level 31 to the level of said meeting faces where the spray tends not only to provide the desired lubrication but also to receive and carry off heat developed at this point. The spray and fluid adjacent the meeting faces of the seal members are thrown by the radial passages 60 outward in a generally horizontal direction into engagement with the inclined surface 52 of the heat sink member 46, whereby there is a constant impingement and wiping action of the driven fluid and spray which is highly effective in transferring heat to the said heat sink. The cooling fluid circulating in the passageway 49 picks up heat and carries it out with the outflow.

The downwardly extending annular wall 62 serves to limit the extent to which the oil spray skirt 57 agitates the liquid in the oil reservoir. The heat sink member 46 at its outer lower portion is in thermal contact with the body of oil in the said reservoir 33 and thereby tends to cool the adjacent part of the oil reservoir. The part of the heat sink which extends above the level of the oil in the reservoir is adapted to be impinged by the oil spray which is thereby very efficiently cooled.

This arrangement permits of a very compact disposal of the necessary parts of a shaft bearing and seal arrangement. By disposing the spring in the central bore of the shaft 2, it is gotten out of the way of the oil cooling mechanism in a highly advantageous manner. Putting the spring pressure applying means within the confines of the shaft permits of a very close spacing of the lower bearing 7 and the shaft seal. Such close spacing would, however, not be possible without a highly efficient heat extracting provision which this invention provides.

The seal and bearing arrangement above described has been subject to operation under internal pressures from 30 inches vacuum to 15 pounds per square inch positive pressure over an extended period, with highly satisfactory results.

I do not intend to be limited to the details shown and described, except as they are made essential by specific reference to the appended claims.

I claim:

1. In combination with a pair of cooperating shaft seal members, a shaft carrying one of said members, said member being movable endwise of the shaft for application to the other seal member, said shaft having a longitudinal bore, spring means disposed in said bore, said shaft having radially disposed slots communicating with said bore, and a spider yieldingly loaded by said spring means and having radially extending arms guided in said slots, said arms engaging the movable seal member to apply spring pressure thereto endwise of the shaft.

2. The combination of claim 1 wherein said shaft is vertically mounted and the upper end of said bore is sealed off to form an air trap.

3. In combination with a pair of cooperating shaft seal members, a shaft carrying one of said members, said member being movable endwise of the shaft for application to the other seal member, said shaft having an axial longitudinal bore, a spring actuated thrust rod disposed in said bore, said shaft having radially disposed slots communicating with said bore, and a spider having radially extending arms guided in said slots, said spider being engaged by said spring actuated rod, and the arms thereof engaging the movable seal member to apply spring pressure thereto endwise of the shaft.

4. In combination, a pair of cooperating mechanical seal elements and a shaft to be sealed thereby, said seal elements comprising a stationary seal member and a movable seal member carried by the shaft and sealed thereto and mounted for limited motion endwise of the shaft to take up wear, a bearing for the shaft adjacent the shaft seal, said shaft having a longitudinal axial bore, a spring actuated rod disposed for free longitudinal movement in said bore, a pressure transfer member having arms extending radially of said shaft and guided longitudinally of the shaft, said arms engaging the movable seal member to apply it yieldingly into contact with the stationary seal member.

5. In a pump having a casing, and an impeller shaft entering the casing, the combination of a shaft seal consisting of a movable rubbing part carried by the shaft, and a stationary rubbing part carried by the casing, a spring carried by the shaft for applying the movable seal part to the stationary seal part, a bearing for the shaft disposed adjacent the movable seal part, and a pressure transmitting rod extending lengthwise of the shaft and lying inside said bearing for applying pressure from the spring to the movable seal part.

6. The combination of claim 5 with a pool of lubicant for cooling and lubricating said seal, a heat sink element comprising a hollow fluid cooled heat conducting member disposed in thermal conductive relation to the pool of lubricant and extending above the level of the same for preventing a destructive build-up of temperature upon either the bearing or upon the seal, and means on the shaft for spraying oil from the pool upon the seal and upon the said unsubmerged part of the heat sink element.

7. In combination with a shaft, a shaft seal comprising a movable seal member carried by the shaft and being axially adjustable for wear, said shaft having a longitudinal axial bore, a plurality of radially extending slots communicating with said bore, a spider having arms lying in said slots and pressing upon the movable seal member, a spray impeller carried on the shaft and keyed to said spider for rotation therewith, a reservoir and means for holding lubricant at a predetermined level therein, said spray impeller having a downwardly extending flange dipping into the lubricant in the reservoir, the impeller having means for producing spray inside said flange to lubricate the seal members and means for producing spray outside the flange above the level of the lubricant in the reservoir, and a heat sink member disposed in contact with the lubricant in the reservoir and having a part disposed above the level of the lubricant in the reservoir, said latter part of the heat sink being engaged by the spray of lubricant outside the flange, whereby the sprayed lubricant is cooled and drained back into the reservoir.

8. In combination a shaft, a shaft seal, comprising members in rubbing engagement, a reservoir and means for holding a body of lubricant at a predetermined level therein below the level of the seal engagement, a spray impeller having a downwardly extending skirt lying outside of the seal and dipping below the predetermined level of the lubricant, and a heat sink member lying radially outside said spray impeller and having a portion exposed above the predetermined level of lubricant in the reservoir, said spray impeller having means for spraying the seal members with lubricant, and having means for spraying lubricant upon the exposed part of the heat sink member.

9. In a shaft seal, a shaft, a wall through which the shaft projects, a seal ring member on the shaft, a cooperating seal ring member on the wall about the shaft, said seal members being in rubbing engagement to maintain a fluid-tight seal, said wall having a reservoir in which liquid lubricant is trapped at substantially a predetermined level, a heat sink member having a wall above the level of liquid in the reservoir and a spray impeller carried on the shaft and having a spray creating portion radially disposed between the seal members and said wall of said heat sink member, said spray creating portion extending below said predetermined level and upon rotation of the shaft causing spray of liquid lubricant to be thrown inwardly upon the seal members to lubricate them, and also outwardly upon the heat sink wall for cooling said lubricant, and excess lubricant thrown on said seal members and upon said heat sink wall draining back into the reservoir.

10. In a shaft seal, a vertical shaft, a horizontally extending wall through which the shaft extends, said wall providing an oil sump having a predetermined level therein, annular seal rings carried on said wall and on said shaft, respectively, and engaging to form a rubbing fluid tight seal above said predetermined level, means for pressing said seal rings together to maintain them in fluid tight engagement, a water cooled cover member covering said sump and having a depending annular portion extending into the reservoir to a point below said predetermined level whereby to form a chamber over the inner part of the reservoir communicating with said seal rings, and a spray impeller carried on the shaft and disposed radially between the seal rings and the depending portion of the cover member for spraying oil upon the seal and outwardly upon the depending portion of the cover member, the spray created by said spray creating member being confined to said chamber by the depending portion of the cover member, the oil sump outside said chamber communicating with the atmosphere.

11. The seal of claim 10 further characterized by the shaft having a supporting bearing above the seal rings, and said water cooled cover member being interposed in thermally conductive relation between said bearing and said oil in the sump to avoid temperature build-up by heat from both the bearing and the seal.

References Cited in the file of this patent
UNITED STATES PATENTS

| | | |
|---|---|---|
| 2,698,773 | Kaczor | Jan. 4, 1955 |
| 2,707,135 | Monahan | Apr. 26, 1955 |